US010001063B2

(12) United States Patent
Suciu et al.

(10) Patent No.: US 10,001,063 B2
(45) Date of Patent: Jun. 19, 2018

(54) ANGLED CORE GAS TURBINE ENGINE MOUNTING

(71) Applicant: United Technologies Corporation, Hartford, CT (US)

(72) Inventors: Gabriel L. Suciu, Glastonbury, CT (US); Jesse M. Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 474 days.

(21) Appl. No.: 14/440,698

(22) PCT Filed: Mar. 14, 2013

(86) PCT No.: PCT/US2013/031197
§ 371 (c)(1),
(2) Date: May 5, 2015

(87) PCT Pub. No.: WO2014/074145
PCT Pub. Date: May 15, 2014

(65) Prior Publication Data
US 2015/0292411 A1 Oct. 15, 2015

Related U.S. Application Data

(60) Provisional application No. 61/725,099, filed on Nov. 12, 2012.

(51) Int. Cl.
F02C 3/04 (2006.01)
F02C 7/20 (2006.01)
(Continued)

(52) U.S. Cl.
CPC .............. *F02C 7/20* (2013.01); *B64D 27/20* (2013.01); *B64D 33/02* (2013.01); *B64D 2033/0286* (2013.01); *F05D 2250/314* (2013.01)

(58) Field of Classification Search
USPC ......... 60/805, 263, 363, 364, 365, 366, 367, 60/250, 39.37, 39.38
See application file for complete search history.

(56) References Cited

U.S. PATENT DOCUMENTS 3,318,095 A * 5/1967 Snell .................. B64C 29/0066
60/224
3,972,490 A 8/1976 Zimmermann et al.
(Continued)

OTHER PUBLICATIONS

International Search Report and Written Opinion for International Application No. PCT/US2013/031197 dated Dec. 4, 2013.
(Continued)

*Primary Examiner* — Binh Q Tran
(74) *Attorney, Agent, or Firm* — Carlson, Gaskey & Olds P.C.

(57) ABSTRACT

A propulsion system for an aircraft includes first and second turbine engines mounted within a fuselage of the aircraft. The first turbine engine includes a first engine core that drives a first propulsor disposed about a first propulsor axis. The second turbine engine includes a second engine core and a second propulsor disposed about a second propulsor axis parallel to the first propulsor axis. The first engine core and the second engine core are mounted at an angle relative to corresponding ones of the first and second propulsor axes.

20 Claims, 3 Drawing Sheets

(51) Int. Cl.
  *B64D 27/20* (2006.01)
  *B64D 33/02* (2006.01)

(56) References Cited

U.S. PATENT DOCUMENTS

| | | | |
|---|---|---|---|
| 4,500,055 A | 2/1985 | Krojer | |
| 5,131,605 A | 7/1992 | Kress | |
| 6,543,718 B2 | 4/2003 | Provost | |
| 6,792,746 B2 | 9/2004 | Saito et al. | |
| 6,918,244 B2 * | 7/2005 | Dickau | B64C 15/02 239/265.27 |
| 7,107,755 B2 | 9/2006 | El Hamel et al. | |
| 7,162,859 B2 * | 1/2007 | Franchet | F02K 3/025 60/204 |
| 7,540,450 B2 | 6/2009 | Brand et al. | |
| 7,770,377 B2 * | 8/2010 | Rolt | F02K 3/06 60/226.1 |
| 7,775,834 B2 | 8/2010 | Zauber et al. | |
| 8,015,796 B2 | 9/2011 | Babu et al. | |
| 8,167,239 B2 | 5/2012 | Guering et al. | |
| 8,186,617 B2 | 5/2012 | Llamas Sandin | |
| 8,955,304 B2 * | 2/2015 | Suciu | F02K 3/06 60/224 |
| 9,567,062 B2 * | 2/2017 | Chandler | B64C 5/06 |
| 2001/0011691 A1 | 8/2001 | Provost | |
| 2002/0190158 A1 | 12/2002 | Franchet et al. | |
| 2004/0025493 A1 | 2/2004 | Wojciechowski | |
| 2006/0144991 A1 | 7/2006 | Frediani | |
| 2010/0155526 A1 | 6/2010 | Negulescu | |
| 2012/0272656 A1 * | 11/2012 | Norris | F02C 3/145 60/772 |

OTHER PUBLICATIONS

International Preliminary Report on Patentability for International Application No. PCT/US2013/031197 dated May 21, 2015.

* cited by examiner

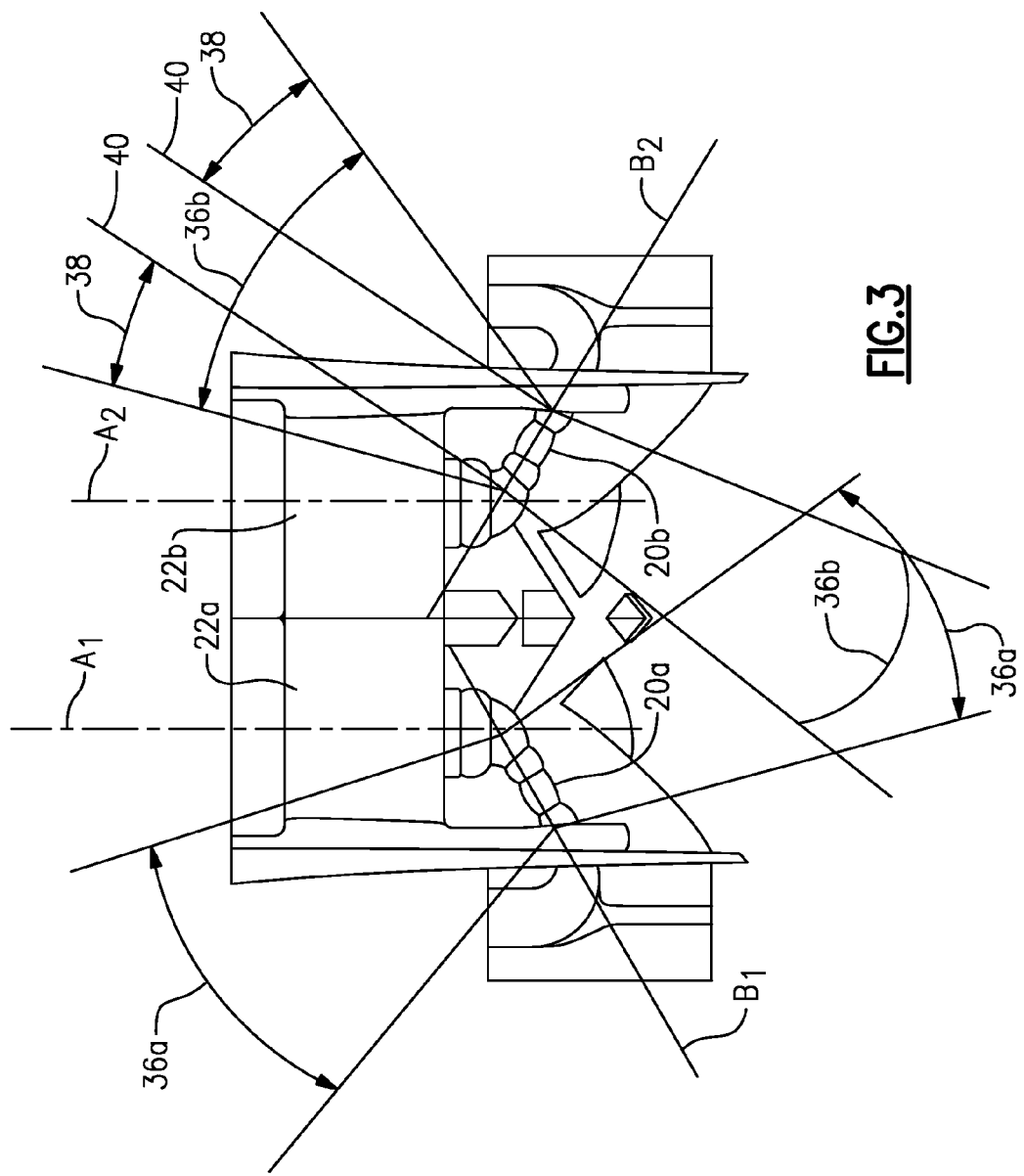

ANGLED CORE GAS TURBINE ENGINE MOUNTING

CROSS REFERENCE TO RELATED APPLICATION

This application claims priority to U.S. Provisional Application No. 61/725,099 filed on Nov. 12, 2012.

STATEMENT REGARDING FEDERALLY SPONSORED RESEARCH OR DEVELOPMENT

This invention was made with government support under NASA Cooperative Agreement No. NNX11AB35A. The Government has certain rights in this invention.

BACKGROUND

Conventional aircraft architecture includes wing mounted gas turbine engines. In some aircraft architectures gas turbine engines are mounted atop the fuselage or on opposite sides of the aircraft fuselage.

Commercial aircraft typically utilize gas turbine engines that in include a fan section driven by an engine core or gas generator. The engine core includes a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section through a driven shaft.

Alternate aircraft architectures may require alternate mounting locations of the gas turbine engines to enable specific wing and fuselage configurations. However, conventional gas turbine engine configurations have been developed to operate with conventional aircraft architectures.

Accordingly, alternate gas turbine engine configurations may be required and developed to enable implementation of favorable aspects of alternate engine architectures.

SUMMARY

A propulsion system for an aircraft according to an exemplary embodiment of this disclosure, among other possible things includes a first turbine engine including a first engine core that drives a first propulsor. The first propulsor is disposed about a first propulsor axis and the first engine core is disposed about a first core axis that is skewed from the first propulsor axis. A second turbine engine includes a second engine core that drives a second propulsor. The second propulsor is disposed about a second propulsor axis parallel to the first propulsor axis. The second engine core is disposed about a second core axis that is skewed from the one or both of the first propulsor axis and the second core axis.

In a further embodiment of the foregoing aircraft, the first core axis and the second core axis are angled away from each other.

In a further embodiment of any of the foregoing aircrafts, the first core axis is disposed at an angle greater than ninety (90) degrees relative to the second core axis.

In a further embodiment of any of the foregoing aircrafts, the first core axis and second engine axis are disposed at an angle greater than about thirty (30) degrees relative to the corresponding first and second propulsor axes.

In a further embodiment of any of the foregoing aircrafts, a burst zone is defined about each of the first and second engine cores.

In a further embodiment of any of the foregoing aircrafts, each of the first and second engine cores is disposed outside of a burst zone defined about the other of the first and second engine cores.

In a further embodiment of any of the foregoing aircrafts, the burst zone is defined as burst angle relative to a line extending perpendicular to each end of the corresponding first and second engine core.

In a further embodiment of any of the foregoing aircrafts, the burst angle is at least about +/− fifteen (15) degrees.

In a further embodiment of any of the foregoing aircrafts, the first and second engine cores include a reverse flow gas turbine engine.

An aircraft according to an exemplary embodiment of this disclosure, among other possible things includes a fuselage, and a first turbine engine including a first engine core that drives a first propulsor. The first propulsor is disposed about a first propulsor axis. A second turbine engine includes a second engine core and a second propulsor. The second propulsor is disposed about a second propulsor axis parallel to the first propulsor axis. The first engine core and the second engine core are mounted at an angle relative a corresponding one of the first and second propulsor axes.

In a further embodiment of the foregoing aircraft, the first engine core is disposed about a first engine axis and the second engine core is disposed about a second engine axis. The first engine axis and the second engine axis are angled away from each other.

In a further embodiment of any of the foregoing aircrafts, the first engine axis is disposed at an angle greater than ninety (90) degrees relative to the second engine axis.

In a further embodiment of any of the foregoing aircrafts, the first engine axis and second engine axis are disposed at an angle greater than about thirty (30) degrees relative to the corresponding first and second propulsor axes.

In a further embodiment of any of the foregoing aircrafts, a burst zone is defined about each of the first and second engine cores.

In a further embodiment of any of the foregoing aircrafts, each of the first and second engine cores is disposed outside of a burst zone defined about the other of the first and second engine cores.

In a further embodiment of any of the foregoing aircrafts, the burst zone is defined as burst angle relative to a line extending perpendicular to each end of the corresponding first and second engine core.

In a further embodiment of any of the foregoing aircrafts, the burst angle is at least about +/− fifteen (15) degrees.

In a further embodiment of any of the foregoing aircrafts, the first and second engine cores include a reverse flow gas turbine engine.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 3 is a schematic view of a burst zone defined about the example propulsion system.

DETAILED DESCRIPTION

Figure 1:
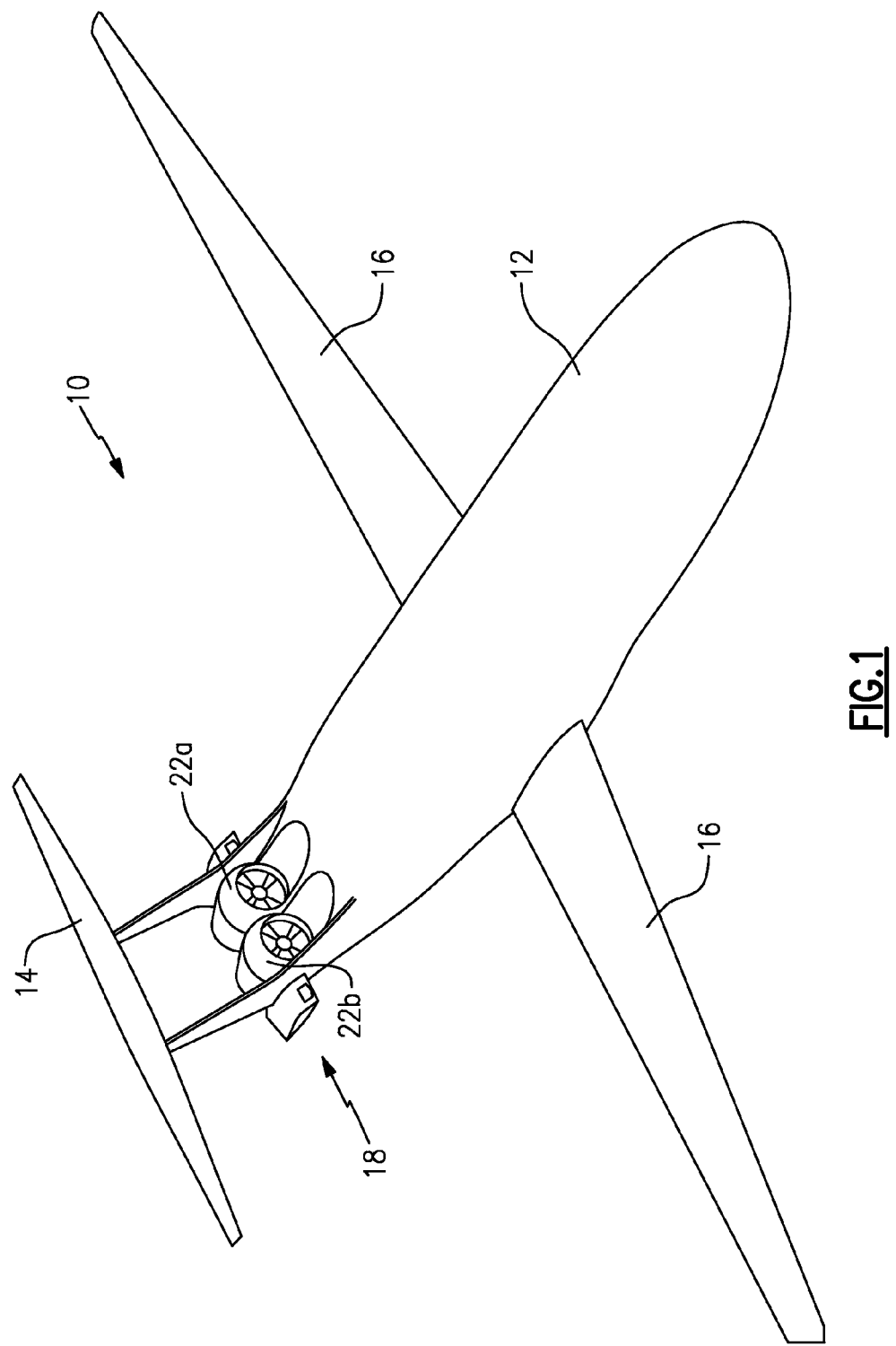
FIG. 1 is a schematic view of an aircraft including a propulsion system mounted within the fuselage.
Figure 2:
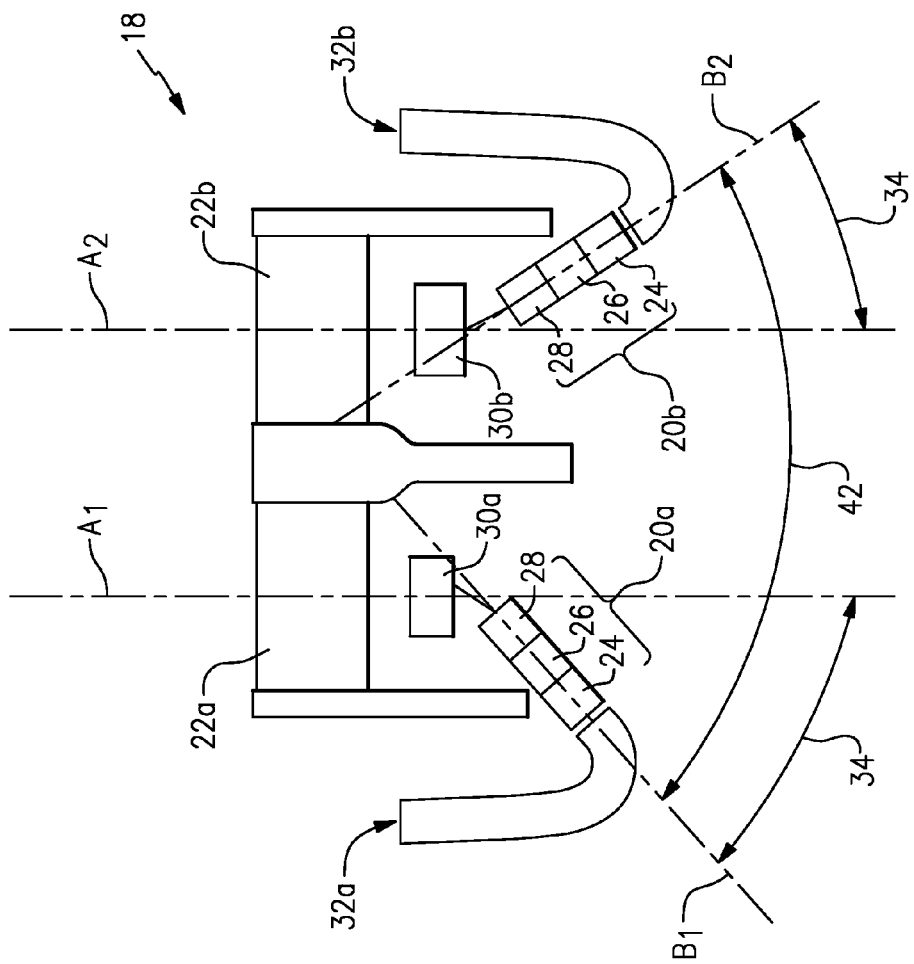
FIG. 2 is a schematic view of the example propulsion system.

Referring to the FIGS. 1 and 2 an aircraft 10 includes a fuselage 12 having wings 16 and a tail 14. A propulsion system 18 is mounted aft end of the fuselage 12. The propulsion system 18 includes first and second engine cores 20a-b, which are reverse core gas turbine engines that drive corresponding first and second propulsors that include respective fan sections 22a-b. The first and second fan sections 22a-b provide the propulsive thrust of the disclosed propulsion system.

Each of the fan sections 22a-b are disposed about corresponding first and second propulsor axis A1 and A2. The first and second engine cores 20a-b is disposed about a corresponding first and second engine axes B1 and B2. That is the first engine core 20a is disposed about the first engine axis B1 and drives the first propulsor about the first propulsor axis A1. The second engine core 20b is disposed about the second engine axis B2 and drives the second fan section 20b about the second propulsor axis A2.

The illustrated reverse engine cores 20a-b are gas generators that include a compressor 24, a combustor 26 and a turbine 28. Air is drawn in through inlets 32a-b to the compressor 24 is compressed and communicated to a combustor 26. In the combustor 26, air is mixed with fuel and ignited to generate an exhaust gas stream that expands through the turbine 28 where energy is extracted and utilized to drive the compressor 24 and corresponding fan 22a-b. In this example the engine cores 20a-b drive the corresponding fan 22a-b through a geared architecture 30a-b.

In the disclosed example, each of the first and second fans 22a-b and related gearing 30a-b is mounted substantially parallel to each other about respective propulsor axes A1, A2. The first and second engine axes B1, B2 are disposed at an angle 34 relative to the corresponding propulsor axis A1, A2. In this example the angle 34 is greater than about thirty (30) degrees. As appreciated other angles are within the contemplation of this disclosure.

Referring to FIG. 3, with continued reference to FIG. 2, gas turbine engines are not typically mounted next to each other due to practical limitations related to overall aircraft survivability in the event of engine failure. A burst zone is defined between gas turbine engines within which another gas turbine engine is not permitted due to possible fragmentation from one failed engine disabling the second engine.

The disclosed engine cores 20a-b are disposed at the angle 34 relative to the corresponding propulsor axes A1 and A2 and to each other such that neither engine core 20a-b is disposed within a burst zone 36a-b of the other engine core 20a-b. In other words, each of the engine cores 20a-b is disposed at an angle away from the other engine core 20a-b such that each is orientated outside of the others bust zone 36a-b. In this example, the engine cores 20a-b are angled away from each other at an angle 42 (FIG. 2). In this example, the angle 42 is greater than about ninety (90) degrees. As appreciated other angles 42 could be utilized depending on the definition of respective burst zones 36a-b.

The respective bust zones 36a-b is defined as respective annular regions about the corresponding engine core 20a-b. In this example the annular region is disposed at an angle 38 outward from a line 40 perpendicular to the engine axis B1, B2. The example angle is at least fifteen (15) degrees and is determined based on application specific considerations. Moreover, airframe regulations may also define an angular span of the burst zones 36a-b and thereby the angle 38.

The relative orientation between the first and second engine cores 20a-b defines the corresponding bust zones 36a-b that does not interfere with the other engine core 20a-b to comply with application specific survivability requirements.

Accordingly, because the gas generators are mounted in a configuration placing each outside of the others burst zone, fuselage and substantially adjacent mounted propulsors are feasible within desired limitations. The side by side adjacent mounting configuration further enables alternate aircraft architectures.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system for an aircraft comprising:
   a first turbine engine including a first engine core that drives a first propulsor, wherein the first propulsor is disposed about a first propulsor axis and the first engine core is disposed downstream from the first propulsor about a first core axis that is angled away from the first propulsor axis in a downstream direction; and
   a second turbine engine including a second engine core that drives a second propulsor, wherein the second propulsor is disposed about a second propulsor axis parallel to the first propulsor axis, and the second engine core is disposed downstream from the second propulsor about a second core axis that is angled away from the one or both of the first propulsor axis and the second core axis in the downstream direction.

2. The propulsion system as recited in claim 1, wherein the first core axis and the second core axis are angled away from each other in a downstream direction.

3. The propulsion system as recited in claim 2, wherein the first core axis is disposed at an angle greater than ninety (90) degrees relative to the second core axis.

4. The propulsion system as recited in claim 2, wherein the first core axis and second engine axis are disposed at an angle greater than about thirty (30) degrees relative to the corresponding first and second propulsor axes.

5. The propulsion system as recited in claim 2, wherein a burst zone is defined about each of the first and second engine cores.

6. The propulsion system as recited in claim 5, wherein each of the first and second engine cores is disposed outside of a burst zone defined about the other of the first and second engine cores.

7. The propulsion system as recited in claim 5, wherein the burst zone is defined as burst angle relative to a line extending perpendicular to each end of the corresponding first and second engine core.

8. The propulsion system as recited in claim 7, wherein the burst angle is at least about +/− fifteen (15) degrees.

9. The propulsion system as recited in claim 1, wherein the first and second engine cores comprise a reverse flow gas turbine engine.

10. An aircraft comprising;
    a fuselage;
    a first turbine engine including a first engine core that drives a first propulsor, wherein the first propulsor is disposed about a first propulsor axis; and a second turbine engine including a second engine core and a second propulsor, wherein the second propulsor is disposed about a second propulsor axis parallel to the first propulsor axis, and the first engine core and the second engine core are mounted at an angle relative a corresponding one of the first and second propulsor axes.

11. The aircraft as recited in claim 10, wherein the first engine core is disposed about a first engine axis and the second engine core is disposed about a second engine axis, wherein the first engine axis and the second engine axis are angled away from each other in a downstream direction.

12. The aircraft as recited in claim 11, wherein the first engine axis is disposed at an angle greater than ninety (90) degrees relative to the second engine axis.

13. The aircraft as recited in claim 11, wherein the first engine axis and second engine axis are disposed at an angle greater than about thirty (30) degrees relative to the corresponding first and second propulsor axes.

14. The aircraft as recited in claim 11, wherein a burst zone is defined about each of the first and second engine cores.

15. The aircraft as recited in claim 14, wherein each of the first and second engine cores is disposed outside of a burst zone defined about the other of the first and second engine cores.

16. The aircraft as recited in claim 14, wherein the burst zone is defined as burst angle relative to a line extending perpendicular to each end of the corresponding first and second engine core.

17. The aircraft as recited in claim 16, wherein the burst angle is at least about +/− fifteen (15) degrees.

18. The aircraft as recited in claim 10, wherein the first and second engine cores comprise a reverse flow gas turbine engine.

19. The aircraft as recited in claim 10, wherein first core engine is coupled to drive the first propulsor through a first geared architecture and the second core engine is coupled to drive the second propulsor through a second geared architecture.

20. The propulsion system as recited in claim 1, wherein first core engine is coupled to drive the first propulsor through a first geared architecture and the second core engine is coupled to drive the second propulsor through a second geared architecture.

* * * * *